(12) United States Patent
Dorr et al.

(10) Patent No.: US 11,609,141 B2
(45) Date of Patent: Mar. 21, 2023

(54) CONDITION DETECTION OF PRESSURE TRANSMITTER DIAPHRAGM

(71) Applicant: Schneider Electric Systems USA, Inc., Foxboro, MA (US)

(72) Inventors: Timothy E. Dorr, Medway, MA (US); Peter E. Allstrom, Warwick, RI (US)

(73) Assignee: SCHNEIDER ELECTRIC SYSTEMS USA, INC., Foxboro, MA (US)

( * ) Notice: Subject to any disclaimer, the term of this patent is extended or adjusted under 35 U.S.C. 154(b) by 74 days.

(21) Appl. No.: 17/335,198

(22) Filed: Jun. 1, 2021

(65) Prior Publication Data
US 2022/0381638 A1 Dec. 1, 2022

(51) Int. Cl.
*G01L 9/02* (2006.01)
*G01L 19/06* (2006.01)
*G01L 27/00* (2006.01)
*G01N 27/04* (2006.01)
*G01L 9/00* (2006.01)
*G01N 27/22* (2006.01)

(52) U.S. Cl.
CPC .......... *G01L 27/007* (2013.01); *G01L 9/0051* (2013.01); *G01L 19/0645* (2013.01); *G01N 27/04* (2013.01); *G01N 27/221* (2013.01)

(58) Field of Classification Search
CPC ....... G01L 27/00; G01L 27/007; G01N 27/06; G01N 27/07; G01N 27/08; G01N 27/10; G01N 27/12; G01N 27/14; G01N 27/16; G01N 27/18; G01N 27/185; G01N 27/20; G01N 27/205; G01N 27/22
See application file for complete search history.

(56) References Cited

U.S. PATENT DOCUMENTS

| | | | | |
|---|---|---|---|---|
| 3,739,644 A | * | 6/1973 | Underwood | G01L 9/065 338/4 |
| 4,646,070 A | * | 2/1987 | Yasuhara | G01N 33/2888 73/53.07 |
| 5,072,190 A | * | 12/1991 | Martin | G01R 27/22 324/693 |
| 5,329,818 A | * | 7/1994 | Frick | G01L 19/02 73/718 |

(Continued)

FOREIGN PATENT DOCUMENTS

GB 984418 A * 2/1965

OTHER PUBLICATIONS

Extended European Search Report, dated Oct. 10, 2022, 12 pages.

*Primary Examiner* — Herbert K Roberts
(74) *Attorney, Agent, or Firm* — Stinson LLP

(57) ABSTRACT

A material property sensor for a pressure transmitter comprises a sensing pattern immersed in a fill fluid. The pressure transmitter comprises a diaphragm configured for contact with a process fluid at an exterior surface of the diaphragm. The pressure transmitter further comprises a pressure sensor configured for sensing a pressure of the process fluid on the diaphragm. The pressure sensor and the diaphragm define a cavity within which the fill fluid is disposed such that the diaphragm of the pressure sensor is in contact with the fill fluid at an interior surface of the diaphragm. The sensing pattern is immersed in the fill fluid within the cavity and configured to measure an electrical property of the fill fluid at an initial time and at one or more subsequent times during operation of the pressure transmitter.

17 Claims, 5 Drawing Sheets

(56) References Cited

U.S. PATENT DOCUMENTS

| | | | |
|---|---|---|---|
| 5,959,213 A * | 9/1999 | Ikeda | G01L 13/025 |
| | | | 73/717 |
| 2004/0244494 A1 | 12/2004 | Woest | |
| 2012/0326711 A1* | 12/2012 | Roper | G01N 27/025 |
| | | | 324/252 |
| 2015/0212024 A1* | 7/2015 | Banks | G01N 27/30 |
| | | | 73/61.61 |
| 2018/0180504 A1 | 6/2018 | Uehlin et al. | |
| 2021/0010885 A1* | 1/2021 | Matsunami | G01L 9/0073 |

* cited by examiner

CONDITION DETECTION OF PRESSURE TRANSMITTER DIAPHRAGM

FIELD

The present disclosure generally relates to a failure detection device in a pressure transmitter, particularly in a pressure transmitter that utilizes a diaphragm.

BACKGROUND

Pressure sensors are used in various applications which depend on accurate and stable pressure measurements in order to operate reliably. As more industries rely on pressure sensors to monitor and control their applications, demand for these sensors has greatly increased. Various pressure sensor designs exist, with varying effectiveness and convenience. In particular, pressure sensors that utilize diaphragms made of thin material are popular.

SUMMARY

Aspects of the present disclosure permit detection of the condition of a diaphragm in a pressure transmitter. The detected condition may represent actual or predicted diaphragm failure resulting from a cracked, leaking, or otherwise damaged diaphragm.

In one aspect, a material property sensor for a pressure transmitter comprises a sensing pattern immersed in a fill fluid. The pressure transmitter comprises a diaphragm configured for contact with a process fluid at an exterior surface of the diaphragm. The pressure transmitter further comprises a pressure sensor configured for sensing a pressure of the process fluid on the diaphragm. The pressure sensor and the diaphragm define a cavity within which the fill fluid is disposed such that the diaphragm of the pressure sensor is in contact with the fill fluid at an interior surface of the diaphragm. The sensing pattern is immersed in the fill fluid within the cavity and configured to measure an electrical property of the fill fluid at an initial time and at one or more subsequent times during operation of the pressure transmitter.

In another aspect, a method of detecting a changed condition of a pressure transmitter utilizes a pressure transmitter comprising a diaphragm configured for contact with a process fluid at an exterior surface of the diaphragm. The pressure transmitter is further comprised of a pressure sensor configured for sensing a pressure of the process fluid on the diaphragm. The method comprises measuring, at an initial time, one or more properties of a fill fluid in which a sensing pattern is immersed across a range of temperatures and pressures. The method further comprises characterizing a fingerprint of the fill fluid as a function of the one or more dielectric properties thereof measured at the initial time and measuring, at a subsequent time, the one or more dielectric properties of the fill fluid. The method also comprises characterizing a current behavior of the fill fluid as a function of the one or more properties thereof measured at the subsequent time, pressure, and temperature, comparing the current behavior of the fill fluid at the subsequent time to the fingerprint of the fill fluid at the initial time to detect changes in the one or more properties of the fill fluid over time, and generating an alert using an alert circuit in response to a difference between the material property of the fill fluid at the subsequent time and the material property of the fill fluid fingerprint measured at the first time when the difference exceeds a threshold.

In yet another aspect, a pressure transmitter comprises a diaphragm configured for contact with a process fluid at an exterior surface of the diaphragm, a pressure sensor configured for sensing a pressure of the process fluid on the diaphragm, and a fill fluid. The diaphragm of the pressure sensor is in contact with the fill fluid at an interior surface of the diaphragm and the pressure sensor and the diaphragm define a cavity within which the fill fluid is disposed. The pressure transmitter further comprises a sensing pattern immersed in the fill fluid within the cavity and configured to measure an electrical property of the fill fluid at an initial time and at one or more subsequent times during operation of the pressure transmitter.

Other objects and features of the present disclosure will be in part apparent and in part pointed out herein.

BRIEF DESCRIPTION OF THE DRAWINGS

Corresponding reference numbers indicate corresponding parts throughout the drawings.

DETAILED DESCRIPTION

Figure 1:
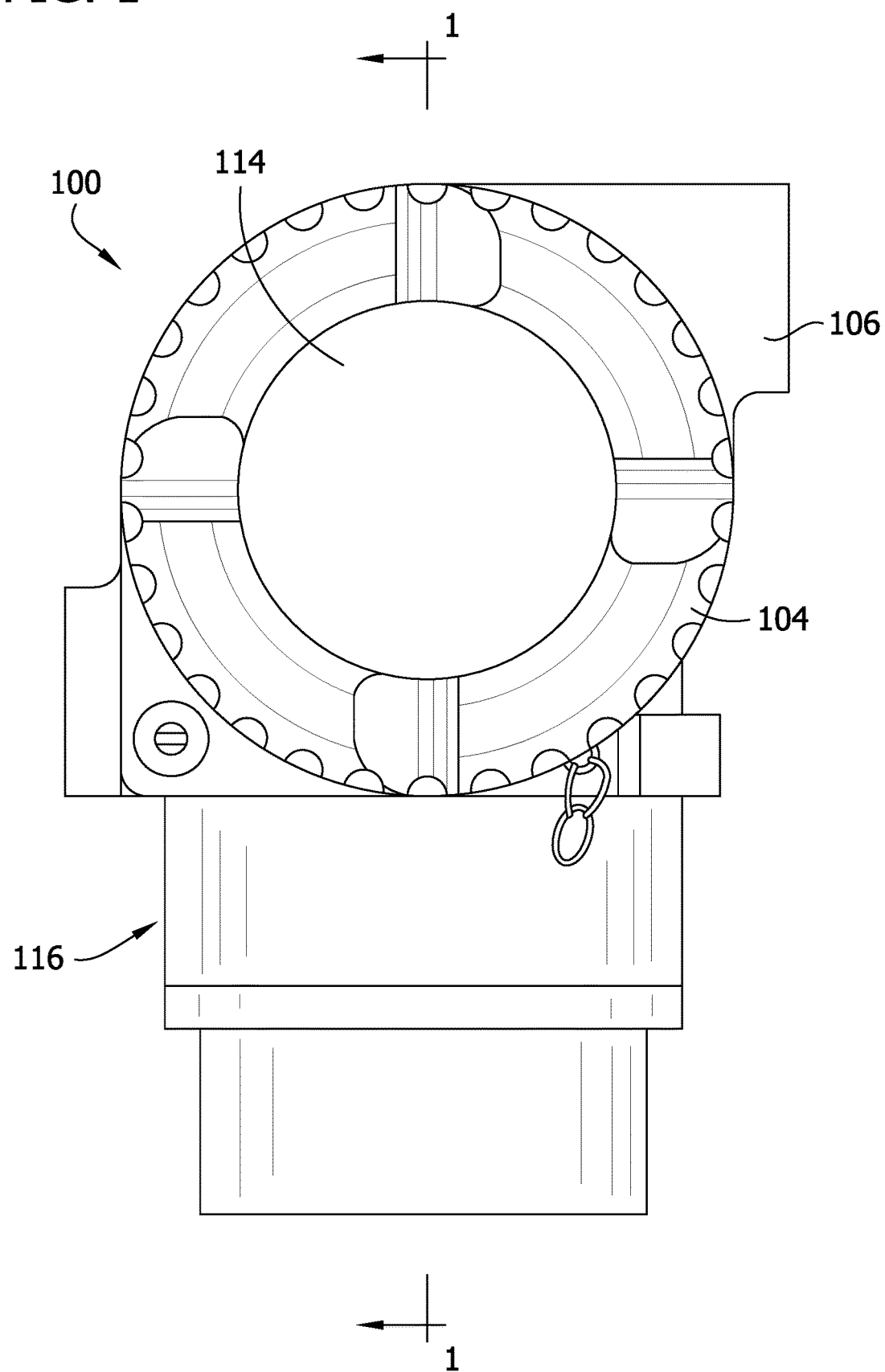
FIG. 1 is a front view of pressure transmitter according to an embodiment.

Referring to FIG. 1, a pressure transmitter 100 according to an embodiment of the present disclosure comprises a user display 102 (e.g. an LCD display) configured behind a transparent cover 114, a user display housing 104, and a sensor housing 106. The user display housing 104 has an opening through which the user display 102 is viewable. In the illustrated embodiment, the pressure transmitter 100 is attached to a fluid source, such as a well head or oil pump, that supplies a process fluid via a pipe in order to measure the pressure of the fluid within the pipe. However, the pressure transmitter 100 is not restricted to fluid pump applications. The pressure transmitter 100 can also be used in industrial applications, chemical applications, automotive applications, medical applications, consumer applications, residential applications, and the like.

Figure 2:
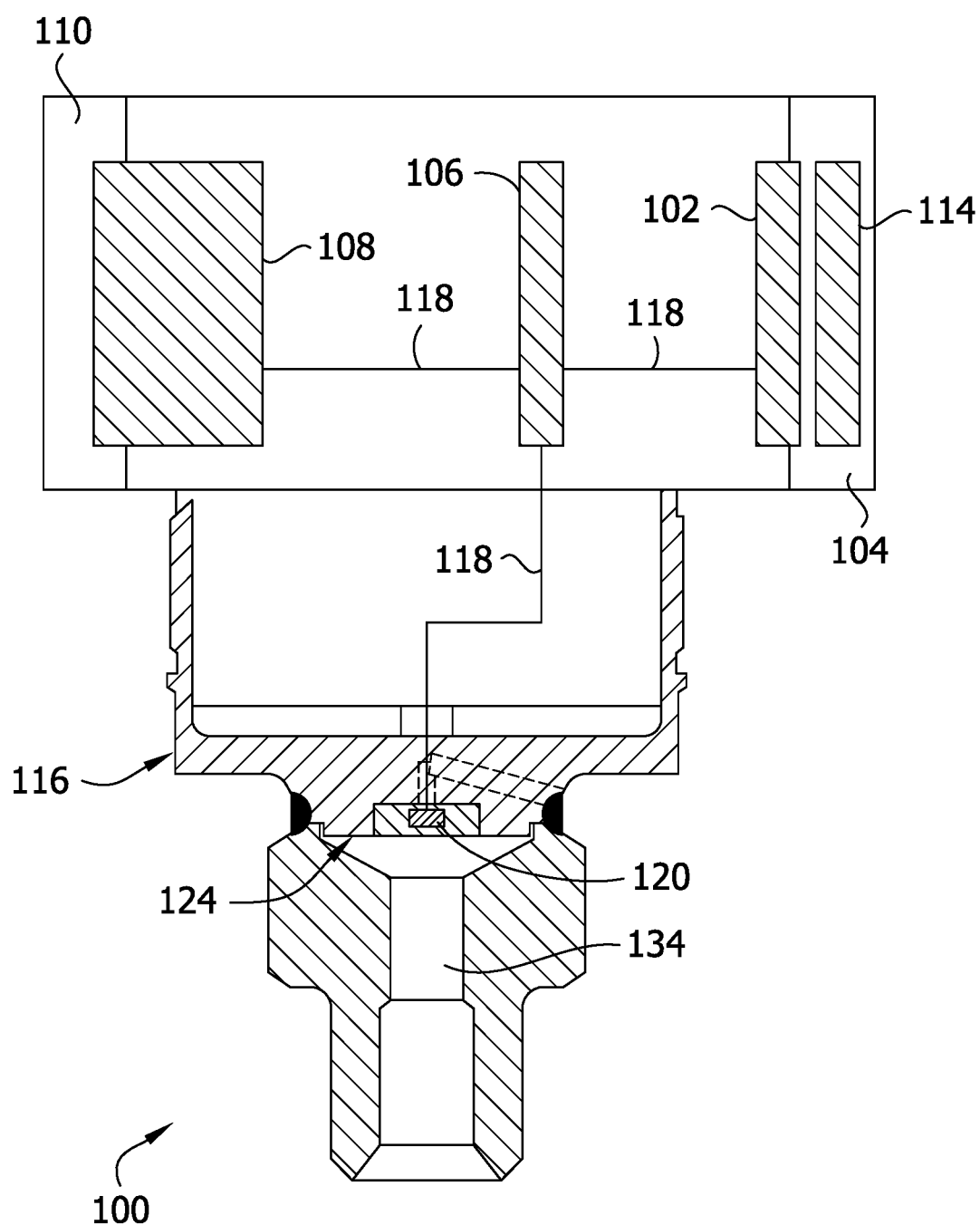
FIG. 2 is a section of the pressure transmitter taken in a plane extending along line 1-1 of FIG. 1.

Referring to FIG. 2, a cross section of the pressure transmitter 100 shows the internal components of the pressure transmitter. As shown in FIG. 2, the pressure transmitter 100 further comprises a user terminal block 108, a user terminal block housing 110, a controller 112, a sensor assembly 116, and electronic connections 118. The sensor housing 106 comprises a front opening, a rear opening, and a bottom opening, wherein the front opening is configured to receive the user display housing 104, the rear opening is configured to receive the user terminal block housing 110, and the bottom opening is configured to receive the sensor assembly 116. The transparent cover 114 is configured to be received in user display housing 104 between the opening of the user display housing and the user display 102.

Figure 3:
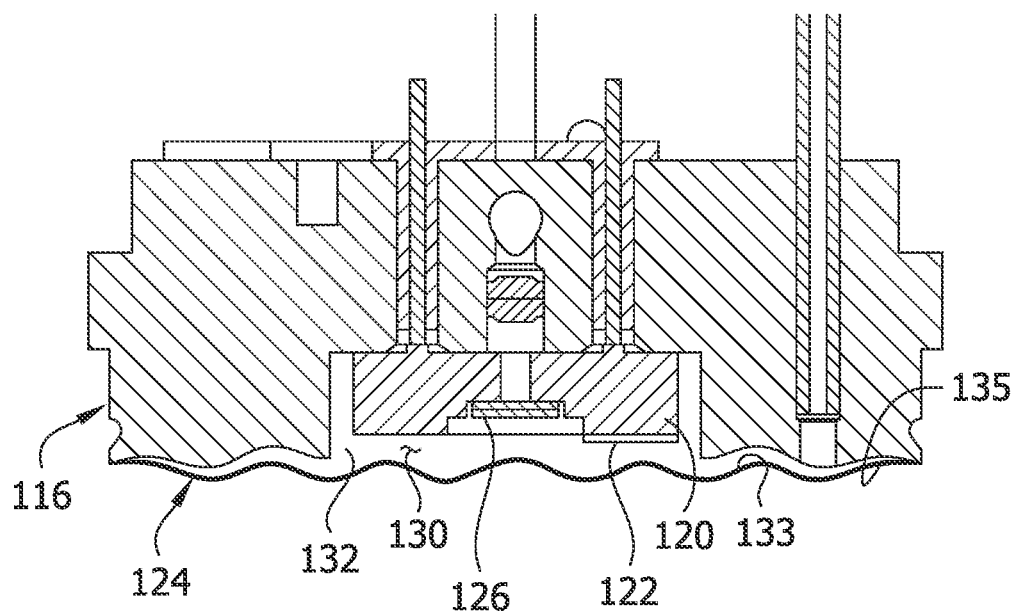
FIG. 3 is a section of a sensor assembly of the pressure transmitter taken in a plane extending along line 1-1 of FIG. 1.

Referring to FIG. 3, the sensor assembly 116 is further comprised of a chip carrier 120, a material property sensor 122, and a diaphragm 124. In one embodiment of the disclosure, the chip carrier 120 is made of a ceramic material. The chip carrier 120 is further configured to support a pressure sensor 126.

In the embodiment of FIGS. 2 and 3, diaphragm 124 is made of a metal material (e.g., stainless steel, Inconel® or other nickel-chromium-based superalloys, Haynes® 242® or other nickel-chromium-molybdenum alloys, Hastelloy® or other nickel-molybdenum alloys, titanium, or Monel). The diaphragm, however, is not limited to metallic materials. Although pressure transmitter 100 as shown in FIGS. 2 and 3 includes a single diaphragm 124, it is to be understood that aspects of the present disclosure can be applied to pressure transmitters having more than one diaphragm.

In the illustrated embodiment, diaphragm 124 is spaced apart from pressure sensor 126 and chip carrier 120 to define a cavity 130 between the diaphragm and the chip carrier. A fill fluid 132 is disposed within the cavity 130, the fill fluid being comprised of an incompressible material (e.g., Silicone 200 DC10 or other silicone fluid, Fluorinert™ FC43 or other fluorinated aliphatic fluids, water, or Neobee N1206TZ). The diaphragm 124 is in contact with the fill fluid 132 at an interior surface 133 of the diaphragm. The sensor assembly 116 is selectively attachable to the user application, such that diaphragm 124 is configured for contact with a process fluid 134 at an exterior surface 135 of the diaphragm 124. In the preferred embodiment, the fill fluid 132 is a fluid different from the process fluid 134 and the fill fluid and the process fluid have different dielectric properties. The material property sensor 122 is further comprised of a sensing pattern 136. The material property sensor 122 and sensing pattern 136 thereof are configured to be immersed in the fill fluid 132 such that the material property sensor can measure an electrical property of the fill fluid, such as conductivity, electrical leakage, resistivity, permittivity, and dielectric constant. As illustrated, material property sensor 122, which includes the sensing pattern 136, is disposed on the surface of the chip carrier 120.

Figure 4:
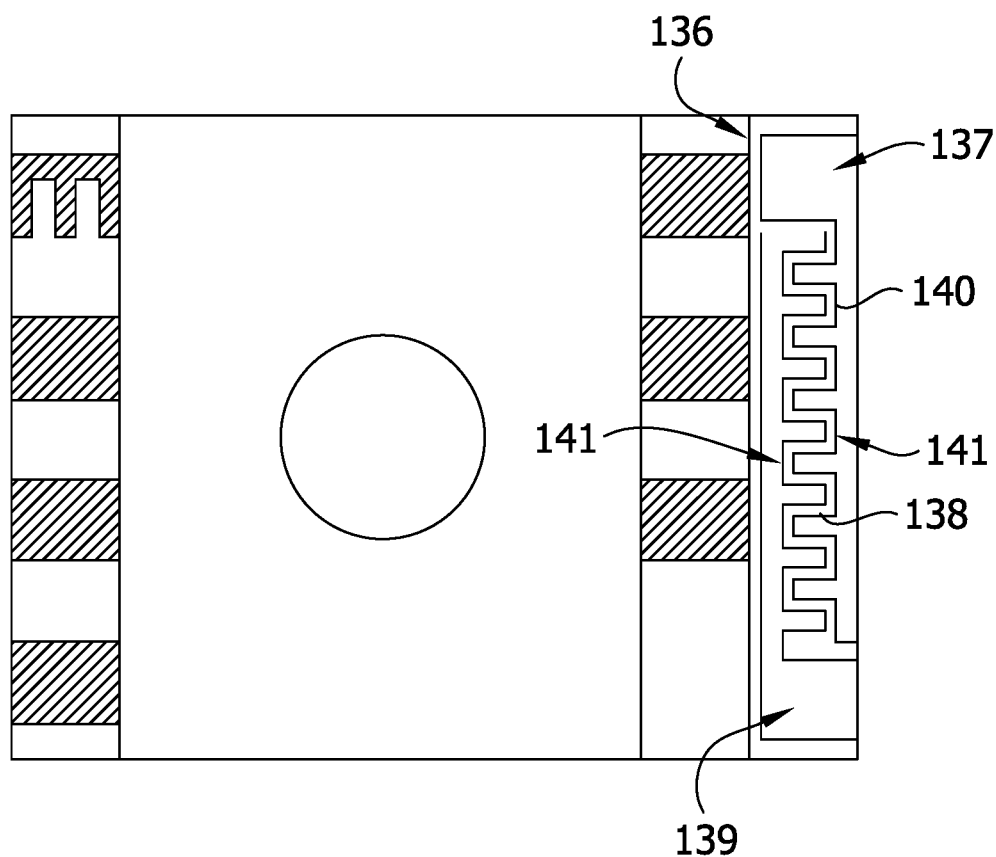
FIG. 4 is a top view of a sensing pattern of a material property sensor of the sensor assembly of FIG. 3.

As shown in FIG. 4, the sensing pattern 136 in the illustrated embodiment is comprised of two generally comb shaped structures 137 and 139, with 90 degree turns defining comb teeth 141 having horizontal segments 138 and vertical segments 140. In this embodiment, the horizontal segments 138 are spaced apart from each other by 0.0060 inches and are 0.0120 inches in length, while the width of the sensing pattern circuit 137 is 0.0030 inches in width. In this embodiment, the width of the sensing pattern 136 is 0.0270 inches. The spacing between the sensing pattern circuit 137 and the side edges of the sensing pattern 136 is 0.0060 inches, while the spacing between the top edge and bottom edge of the sensing pattern 136 and the sensing pattern circuit 137 is 0.0230 inches in the illustrated embodiment. The comb shaped structures 137 and 139 are comprised of conductive elements and together form a capacitor. The fill fluid 132 serves as a dielectric between the two conductive elements such that changes in measured capacitance can be used to detect the dielectric constant of fill fluid 132. In an alternative embodiment of the sensing pattern 136, the teeth 141 would have horizontal segments 138 that have a length greater than 0.0120 inches long. The comb structures 137, 139 are configured to advantageously maximize coupling.

Figure 5:
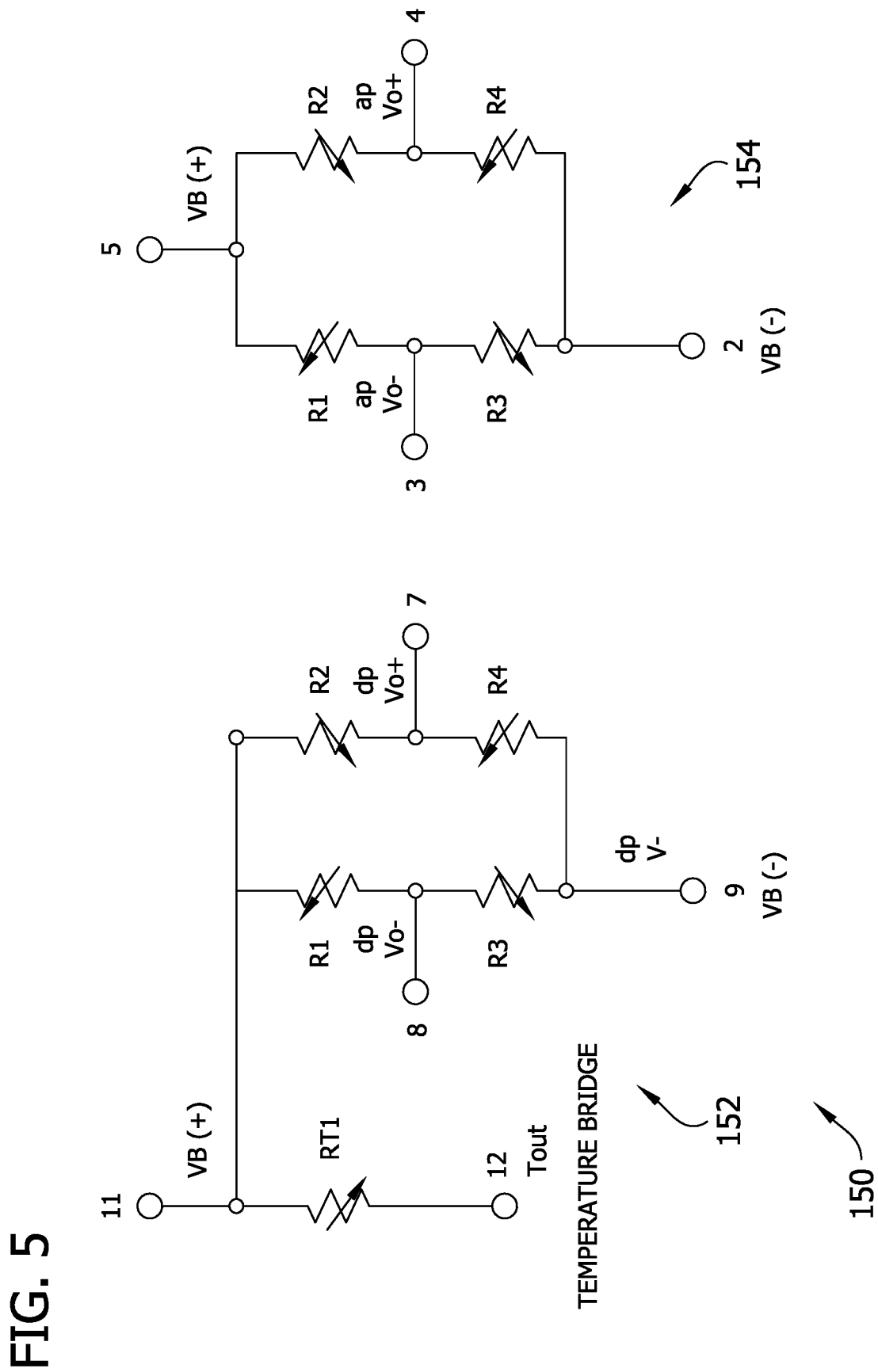
FIG. 5 is a circuit diagram of a Wheatstone bridge circuit for use with the pressure transmitter of FIG. 1.

FIG. 5 illustrates an exemplary circuit diagram embodying further aspects of pressure transmitter 100 in the form of a Wheatstone bridge 150. As shown in FIG. 5, the Wheatstone bridge circuit 150 comprises a temperature bridge 152 and a pressure bridge 154. As an alternative to or in addition to sensing pattern 136, Wheatstone bridge circuit 150 is configured for measuring the material properties of fill fluid 132 by determining its resistance when a voltage is applied across the bridge circuit. For instance, the bridge circuit 150 can be floated to measure resistance. Current is injected at pin 9 of the temperature bridge 152 and the voltage is then read across pin 9 and pin 2 of the pressure bridge 154. The voltage reading is indicative of the resistance of fill fluid 132. Similarly, voltage can be read across a floated bridge circuit in a single variable transmitter having a single bridge circuit for determining the resistance of fill fluid 132. In this embodiment, the sensing pattern 136 comprises the Wheatstone bridge circuit.

In operation, pressure transmitter 100 is configured to sense the pressure of process fluid 134. As process fluid 134 is pressurized as part of the process, the process fluid exerts a force onto diaphragm 124. The diaphragm 124 is configured to be sufficiently thin such that it can deflect in response to the pressure force exerted by process fluid 134. The deflection of diaphragm 124 exerts a force on the incompressible fill fluid 132, which transfers the force to pressure sensor 126. As a result of these transfers of force, pressure sensor 126 measures the changes in pressure caused by process fluid 134 on the exterior surface of diaphragm 124. The pressure sensor 126 is configured to create an electronic signal in response to a force being exerted on the pressure sensor (i.e., a piezoelectric or strain gauge response). The electrical signal is transferred from pressure sensor 126 to the controller 112 through the electrical connection 118. The controller 112 receives the electrical signal and outputs a pressure reading to be displayed on the user display 102. In addition, the user terminal block 108 provides input/output terminations for connecting pressure transmitter 100 to external circuitry.

While pressure transmitter 100 performs its function of reading the pressure of process fluid 134, the material property sensor 122 simultaneously performs measurements of the fill fluid 132 to test the material properties of the fill fluid. As described above, the material property sensor 122 is immersed in the fill fluid 132. At an initial time (t1), the material property sensor 122 measures the electrical properties of the fill fluid using the sensing pattern 136. In an embodiment of this disclosure, material property sensor 122 is capable of measuring the conductivity, electrical leakage, resistivity, permittivity, and the dielectric constant of the fill fluid 132. However, this application should not be construed to limit the material properties of fill fluid 132 that material property sensor 122 is capable of measuring.

In order to measure the conductivity, electrical leakage, resistivity, or permittivity of the fill fluid 132 at t1, a known voltage is applied across sensing pattern 136 at a known resistance while immersed in the fill fluid. In order to measure the dielectric constant of fill fluid 132 at t1, a voltage is applied across sensing pattern 136 at one or more frequencies through a known capacitor while immersed in the fill fluid. The sensing pattern 136 is configured to measure the dielectric property of fill fluid 132 over a range of temperatures and pressures to create a fill fluid fingerprint associated with the dielectric property at t1. By measuring one or more of the material properties of fill fluid 132 across a range of temperatures and pressures at t1, the fingerprint of the fill fluid is capable of determining the value associated with a particular property at a discrete temperature and pressure.

As pressure transmitter 100 operates over time, the forces of process fluid 134 against diaphragm 124 as well as chemical, mechanical, and/or external factors can cause cracks or leaks, for example, that contribute to the eventual failure of diaphragm 124. Once a diaphragm has failed, the sensor 126 can continue to operate with a degraded performance for some time. This degraded performance can yield an incorrect pressure reading which is undesirable in applications. If uncorrected, the false readings of the pressure of the process fluid 134 could lead to unnecessary corrective action, or a delay in necessary corrective action, creating higher costs or loss of product for the user.

When diaphragm 124 fails, it is likely that fill fluid 132 may become contaminated by debris or become mixed with process fluid 134. When fill fluid 132 becomes contaminated, the contamination causes a change in the measured material properties of the fill fluid. The common values of some of the possible fill fluids mentioned above are seen in Table 1 shown below.

TABLE 1

| Material | Volume Resistance 25 C. (150 C.) ohm-cm | Relative dielectric constant |
| --- | --- | --- |
| Silicone 200 DC10 | $5 \times 10^{15}$ ($1 \times 10^{13}$) | 3.7-3.9 |
| Fluorinert FC43 | $10^{15}$ | 1.75 |
| Water | $2 \times 10^{-2} - 2$ | 34-80 |
| Air | $1 \times 10^{12}$ | 1 |

The material property sensor 122 is configured to measure these changes by continuously measuring the material properties of fill fluid 132 at one or more subsequent times tn during the operation of the pressure transmitter 100. The material property sensor 122 is configured to continuously monitor the conductivity, electrical leakage, resistivity, and/or permittivity by applying a voltage across sensing pattern 136 at with a known resistance. Alternatively, the material property sensor 122 is configured to continuously monitor the dielectric constant of fill fluid 132 by applying a known voltage across sensing pattern 136 at one or more frequencies through a known capacitor. The material property sensor 122 can determine, using the fill fluid fingerprint, what the appropriate value of the material property (e.g., conductivity, resistivity, permittivity, electrical leakage, or dielectric constant) of fill fluid 132 should be at the particular temperature and pressure. This value is then compared against the measured value of the material property to determine whether the values match, within a predetermined threshold. In an embodiment, the controller 112 of pressure transmitter 100 generates an alert in response to a difference between the material property of fill fluid 132 at the subsequent time tn and the material property of the fill fluid fingerprint measured at the first time t1 when the difference exceeds the threshold. This alert notifies the user that fill fluid 132 has likely been contaminated in some way, such as through a failure in the diaphragm 124, and thus puts the user on notice that the diaphragm needs to be replaced.

An exemplary method of detecting a changed condition of a pressure transmitter as described above will now be briefly described below. The pressure transmitter 100 comprises diaphragm 124 configured for contact with process fluid 134 at an exterior surface of the diaphragm. The pressure transmitter 100 further comprises pressure sensor 126 configured for sensing a pressure of the process fluid 134 on the diaphragm 124. The method includes a first step of measuring, at an initial time t1, one or more properties of fill fluid 132 in which sensing pattern 136 of, for example, a Wheatstone bridge circuit is immersed across a range of temperatures and pressures. In an embodiment, the sensing pattern 136 is disposed on a chip carrier 120, the chip carrier being preferably made from a ceramic material. The pressure sensor measures the changes in pressure caused by the process fluid 134 at the exterior surface of the diaphragm 124. The dielectric properties may include, but are not limited to, conductivity, electrical leakage, permittivity, resistivity, and dielectric constant. In order to measure the conductivity, electrical leakage, resistivity, or permittivity of the fill fluid 132 at t1, a known voltage is applied across the sensing pattern 136 at a known resistance. In order to measure the dielectric constant of the fill fluid 132 at t1, a voltage is applied across the sensing pattern 136 at one or more frequencies through a known capacitor. In the preferred embodiment of the disclosure, the fill fluid 132 is a fluid different from the process fluid 134 and wherein the fill fluid and the process fluid have different dielectric properties.

In a second step, the method embodying aspects of the present disclosure comprises characterizing a fingerprint of the fill fluid 132 as a function of one or more dielectric properties measured at the initial time t1. By measuring one or more of the material properties of the fill fluid 132 across a range of temperatures and pressures at t1, the fingerprint of the fill fluid is capable of determining the value associated with a particular property at a discrete temperature and pressure.

In a third step, the method comprises measuring, at one or more subsequent times tn, the one or more dielectric properties of the fill fluid 132 during the operation of the pressure transmitter 100. In a fourth step, the method comprises characterizing a current behavior of the fill fluid 132 as a function of the one or more properties thereof measured at the subsequent time, pressure, and temperature. By collecting the temperature and pressure data from the sensor assembly 116, the material property sensor 122 can determine, using the fill fluid fingerprint, what the appropriate value of the material property (e.g., conductivity, resistivity, permittivity, electrical leakage, or dielectric constant) of the fill fluid 132 should be at the particular temperature and pressure.

In a fifth step, the method comprises comparing the current behavior of the fill fluid 132 at the subsequent time tn to the fingerprint of the fill fluid at the initial time t1 to detect changes in the one or more properties of the fill fluid over time. This value is then compared against the measured value of the material property to determine whether the values match, within a predetermined threshold.

In a sixth step, the method comprises generating an alert using an alert circuit in response to a difference between the material property of the fill fluid 132 at the subsequent time tn and the material property of the fill fluid fingerprint measured at the initial time t1 when the difference exceeds the predetermined threshold. This alert notifies the user that the fill fluid 132 has likely been contaminated in some way, such as through a failure in the diaphragm 124, and thus puts the user on notice that the diaphragm needs to be replaced.

The order of execution or performance of the operations in embodiments of the aspects of the invention illustrated and described herein is not essential, unless otherwise specified. That is, the operations may be performed in any order, unless otherwise specified, and embodiments of the aspects of the invention may include additional or fewer operations than those disclosed herein. For example, it is contemplated that executing or performing a particular operation before, contemporaneously with, or after another operation is within the scope of aspects of the invention.

When introducing elements of aspects of the invention or the embodiments thereof, the articles "a," "an," "the," and "said" are intended to mean that there are one or more of the elements. The terms "comprising," "including," and "having" are intended to be inclusive and mean that there may be additional elements other than the listed elements.

Not all of the depicted components illustrated or described may be required. In addition, some implementations and embodiments may include additional components. Variations in the arrangement and type of the components may be made without departing from the spirit or scope of the claims as set forth herein. Additional, different or fewer components may be provided and components may be combined. Alternatively, or in addition, a component may be implemented by several components.

The above description illustrates the aspects of the invention by way of example and not by way of limitation. This description enables one skilled in the art to make and use the aspects of the invention, and describes several embodiments, adaptations, variations, alternatives and uses of the aspects of the invention, including what is presently believed to be the best mode of carrying out the aspects of the invention. Additionally, it is to be understood that the aspects of the invention are not limited in its application to the details of construction and the arrangement of components set forth in the following description or illustrated in the drawings. The aspects of the invention are capable of other embodiments and of being practiced or carried out in various ways. Also, it will be understood that the phraseology and terminology used herein is for the purpose of description and should not be regarded as limiting.

It will be apparent that modifications and variations are possible without departing from the scope of the invention defined in the appended claims. As various changes could be made in the above constructions and methods without departing from the scope of the invention, it is intended that all matter contained in the above description and shown in the accompanying drawings shall be interpreted as illustrative and not in a limiting sense.

In view of the above, it will be seen that several advantages of the aspects of the invention are achieved and other advantageous results attained.

The Abstract and Summary are provided to help the reader quickly ascertain the nature of the technical disclosure. They are submitted with the understanding that they will not be used to interpret or limit the scope or meaning of the claims. The Summary is provided to introduce a selection of concepts in simplified form that are further described in the Detailed Description. The Summary is not intended to identify key features or essential features of the claimed subject matter, nor is it intended to be used as an aid in determining the claimed subject matter.

What is claimed is:

1. A material property sensor for a pressure transmitter, the pressure transmitter comprising a diaphragm configured for contact with a process fluid at an exterior surface of the diaphragm, the pressure transmitter further comprising a pressure sensor configured for sensing a pressure of the process fluid on the diaphragm, the material property sensor comprising:
    a fill fluid, wherein the diaphragm of the pressure sensor is in contact with the fill fluid at an interior surface of the diaphragm, wherein the pressure sensor and the diaphragm define a cavity within which the fill fluid is disposed, and wherein the pressure sensor comprises a first bridge circuit; and
    a sensing pattern immersed in the fill fluid within the cavity and configured to measure a material property of the fill fluid at an initial time and at one or more subsequent times during operation of the pressure transmitter, wherein the sensing pattern comprises a second bridge circuit, the second bridge circuit including a temperature sensor for measuring a temperature of the fill fluid, and wherein a voltage measured across the first and second bridge circuits is indicative of an electrical resistance of the fill fluid, and wherein the material property of the fill fluid is determined as a function of the electrical resistance thereof.

2. The material property sensor as set forth in claim 1 further comprising a chip carrier configured to support the pressure sensor, wherein the sensing pattern is disposed on the chip carrier.

3. The material property sensor as set forth in claim 2, wherein the chip carrier is a ceramic material.

4. The material property sensor as set forth in claim 1, wherein the diaphragm is made of a metallic material.

5. The material property sensor as set forth in claim 1, wherein the fill fluid is an incompressible fluid.

6. The material property sensor as set forth in claim 1, wherein the material property comprises an electrical property, wherein the sensing pattern is configured to measure the electrical property of the fill fluid over a range of temperatures and pressures to create a fill fluid fingerprint associated with the electrical property, and wherein the electrical property comprises at least one of the following: conductivity, resistivity, electrical leakage, dielectric constant, and permittivity.

7. The material property sensor as set forth in claim 6, further comprising an alarm circuit for generating an alert in response to a difference between the electrical property of the fill fluid at the subsequent time and the electrical property of the fill fluid fingerprint measured at the initial time when the difference exceeds a threshold.

8. The material property sensor as set forth in claim 6, wherein the sensing pattern is configured to measure the electrical property of the fill fluid through application of a known voltage across the sensing pattern through a known resistance to create the fill fluid fingerprint.

9. The material property sensor as set forth in claim 1, wherein the material property comprises a dielectric constant, wherein the sensing pattern is configured to measure the dielectric constant of the fill fluid through application of a known voltage across the sensing pattern at one or more frequencies through a known capacitor to create a fill fluid fingerprint associated with the dielectric constant.

10. The material property sensor as set forth in claim 1, wherein the fill fluid is a fluid different from the process fluid and wherein the fill fluid and the process fluid have different dielectric properties.

11. The material property sensor as set forth in claim 1, wherein the pressure sensor measures the changes in pressure caused by the process fluid at the exterior surface of the diaphragm.

12. A method of detecting a changed condition of a pressure transmitter, the pressure transmitter comprising a diaphragm configured for contact with a process fluid at an exterior surface of the diaphragm, the pressure transmitter further comprising a pressure sensor configured for sensing a pressure of the process fluid on the diaphragm, the pressure sensor comprising a first bridge circuit immersed in a fill fluid, wherein the pressure sensor and the diaphragm define a cavity within which the fill fluid is disposed, the method comprising:
    injecting a current in a second bridge circuit, the second bridge circuit immersed in the fill fluid;
    measuring a voltage across the first and second bridge circuits;

measuring, at an initial time, one or more dielectric properties of the fill fluid across a range of temperatures and pressures as a function of the voltage across the first and second bridge circuits;

characterizing a fingerprint of the fill fluid as a function of the one or more dielectric properties thereof measured at the initial time;

measuring, at a subsequent time, the one or more dielectric properties of the fill fluid as a function of the voltage across the first and second bridge circuits;

characterizing a current behavior of the fill fluid as a function of the one or more dielectric properties thereof measured at the subsequent time, pressure, and temperature;

comparing the current behavior of the fill fluid at the subsequent time to the fingerprint of the fill fluid at the initial time to detect changes in the one or more dielectric properties of the fill fluid over time; and generating an alert using an alert circuit in response to a difference between the one or more dielectric properties of the fill fluid at the subsequent time and the one or more dielectric properties of the fill fluid fingerprint measured at the initial time when the difference exceeds a threshold.

13. The method as set forth in claim 12, wherein the first and second bridge circuits are disposed on a chip carrier.

14. The method as set forth in claim 13, wherein the second bridge circuit is a Wheatstone bridge and includes a resistance temperature detector for measuring a temperature of the fill fluid.

15. The method as set forth in claim 13, wherein the fill fluid is a fluid different from the process fluid and wherein the fill fluid and the process fluid have different dielectric properties.

16. A pressure transmitter, comprising:
a diaphragm configured for contact with a process fluid at an exterior surface of the diaphragm;
a pressure sensor configured for sensing a pressure of the process fluid on the diaphragm, wherein the pressure sensor comprises a first bridge circuit;
a fill fluid, wherein the diaphragm of the pressure sensor is in contact with the fill fluid at an interior surface of the diaphragm, wherein the pressure sensor and the diaphragm define a cavity within which the fill fluid is disposed; and
a sensing pattern immersed in the fill fluid within the cavity and configured to measure an electrical property of the fill fluid at an initial time and at one or more subsequent times during operation of the pressure transmitter, wherein the sensing pattern comprises a second bridge circuit, the second bridge circuit including a temperature sensor for measuring a temperature of the fill fluid, and wherein a voltage measured across the first and second bridge circuits is indicative of an electrical resistance of the fill fluid, and wherein the electrical property of the fill fluid is determined as a function of the electrical resistance thereof.

17. The pressure transmitter as set forth in claim 16, wherein the sensing pattern is configured to measure the electrical property of the fill fluid over a range of temperatures and pressures to create a fill fluid fingerprint associated with the electrical property and wherein the electrical property comprises at least one of the following: conductivity, resistivity, electrical leakage, dielectric constant, and permittivity.

* * * * *